(12) United States Patent
Kohchi et al.

(10) Patent No.: US 7,330,692 B2
(45) Date of Patent: Feb. 12, 2008

(54) ELECTRICITY WASTE SUPPRESSING ORIGINAL DOCUMENT SIZE DETECTION APPARATUS

(75) Inventors: Masashi Kohchi, Tokyo (JP); Yasuo Sakurai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 11/305,217

(22) Filed: Dec. 19, 2005

(65) Prior Publication Data

US 2006/0104684 A1 May 18, 2006

Related U.S. Application Data

(63) Continuation of application No. 10/992,738, filed on Nov. 22, 2004.

(30) Foreign Application Priority Data

Nov. 20, 2003 (JP) ............................. 2003-391266

(51) Int. Cl.
G03G 15/00 (2006.01)

(52) U.S. Cl. ...................... 399/376; 399/365; 399/370; 358/449; 358/488

(58) Field of Classification Search ...................... None
See application file for complete search history.

(56) References Cited

U.S. PATENT DOCUMENTS

| | | | | |
|---|---|---|---|---|
| 4,255,042 A | * | 3/1981 | Armitage et al. | ........... 399/187 |
| 4,630,127 A | | 12/1986 | Fuwa | |
| 4,638,987 A | | 1/1987 | Sakurai | |
| 4,715,597 A | | 12/1987 | Sakurai | |
| 4,924,262 A | * | 5/1990 | Budnik | .......... 355/75 |
| 5,198,853 A | * | 3/1993 | Ichihara et al. | ............... 399/16 |
| 5,506,662 A | * | 4/1996 | Morihara | .................... 399/186 |
| 5,693,933 A | | 12/1997 | Takasu et al. | ........... 250/208.1 |
| 5,715,500 A | | 2/1998 | Nakazato et al. | |
| 5,973,797 A | | 10/1999 | Tanaka et al. | |
| 6,034,792 A | | 3/2000 | Nakazato et al. | |
| 6,134,027 A | * | 10/2000 | Lee | ............................. 358/474 |
| 6,678,071 B1 | | 1/2004 | Saito et al. | .................. 358/1.2 |
| 6,721,072 B1 | | 4/2004 | Tsai et al. | .................... 358/471 |
| 6,731,896 B2 | | 5/2004 | Kohchi | |
| 6,760,139 B2 | | 7/2004 | Spears | ........................ 359/223 |

(Continued)

FOREIGN PATENT DOCUMENTS

DE    40 35 568    5/1991

(Continued)

*Primary Examiner*—Daniel J. Colilla
*Assistant Examiner*—W. Ha
(74) *Attorney, Agent, or Firm*—Oblon, Spivak, McClelland, Maier & Neustadt, P.C.

(57) ABSTRACT

An original document reading apparatus includes a plurality of point light source elements (e.g. a LED array) in a main scanning direction beneath an original document table, a moving device that moves the point light source elements in a sub scanning direction, and a photo acceptance unit that accepts light reflected from the original document and determines a size of the original document based upon a reaction of a pixel to the light. The plurality of point light source elements are divided into a plurality of blocks to be turned on and off in successive turns per a block starting from a block corresponding to an original document minimum size to a block corresponding to an original document maximum size.

12 Claims, 12 Drawing Sheets

U.S. PATENT DOCUMENTS

| | | |
|---|---|---|
| 6,779,725 B2 | 8/2004 | Kohchi et al. |
| 6,906,830 B1 | 6/2005 | Hayashi ............... 358/474 |
| 2002/0149805 A1 | 10/2002 | Tanaka et al. ........... 358/498 |
| 2005/0052713 A1 | 3/2005 | Spears et al. ............ 358/509 |
| 2005/0105144 A1 | 5/2005 | Konagaya ............... 358/497 |

FOREIGN PATENT DOCUMENTS

| | | | |
|---|---|---|---|
| JP | 02019066 A | * | 1/1990 |
| JP | 08-069215 | | 3/1996 |
| JP | 08328165 A | * | 12/1996 |
| JP | 09-073141 | | 3/1997 |
| JP | 09247375 A | * | 9/1997 |
| JP | 2002-247296 | | 8/2002 |
| JP | 2002-271583 | | 9/2002 |

* cited by examiner

| ORIGINAL DOCUMENT SIZE | | | DETECTION POSITION | | | |
|---|---|---|---|---|---|---|
| SIZE NAME | DIRECTION | DIMENSIONS (mm) | 1 | 2 | 3 | 4 |
| A3 | TRANSVERSAL | 297 × 420 | ○ | ○ | ○ | ○ |
| B4 | TRANSVERSAL | 257 × 364 | ○ | — | ○ | ○ |
| A4 | TRANSVERSAL | 210 × 297 | — | — | ○ | ○ |
| A4 | LONGITUDINAL | 297 × 210 | ○ | ○ | — | — |
| B5 | TRANSVERSAL | 182 × 257 | — | — | ○ | — |
| B5 | LONGITUDINAL | 257 × 182 | ○ | — | — | — |

FIG. 16

| ORIGINAL DOCUMENT SIZE | | |
|---|---|---|
| SIZE NAME | DIRECTION | DIMENSIONS (MAIN × SUB) |
| A3 | LONGITUDINAL | 297 × 420 (mm) |
| B4 | LONGITUDINAL | 257 × 364 (mm) |
| A4 | LONGITUDINAL | 210 × 297 (mm) |
| A4 | TRANSVERSAL | 297 × 210 (mm) |
| B5 | LONGITUDINAL | 182 × 257 (mm) |
| B5 | TRANSVERSAL | 257 × 182 (mm) |
| A5 | LONGITUDINAL | 148 × 210 (mm) |
| A5 | TRANSVERSAL | 210 × 148 (mm) |
| B6 | LONGITUDINAL | 128 × 182 (mm) |
| B6 | TRANSVERSAL | 182 × 128 (mm) |
| DLT | LONGITUDINAL | 11" × 17" |
| 10 × 15 | LONGITUDINAL | 10" × 15" |
| USB4 | LONGITUDINAL | 10" × 14" |
| LG | LONGITUDINAL | 8 1/2" × 14" |
| Foolscap | LONGITUDINAL | 8 1/2" × 13" |
| Folio | LONGITUDINAL | 8 1/4" × 13" |
| F | LONGITUDINAL | 8" × 13" |
| LT | LONGITUDINAL | 8 1/2" × 11" |
| LT | TRANSVERSAL | 11" × 8 1/2" |
| 8 × 10 | LONGITUDINAL | 8" × 10" |
| 10 × 8 | TRANSVERSAL | 10" × 8" |
| Executive | LONGITUDINAL | 7 1/4" × 10 1/2" |
| HLT | LONGITUDINAL | 5 1/2" × 8 1/2" |
| HLT | TRANSVERSAL | 8 1/2" × 5 1/2" |
| FIRST CHINESE SIZE | LONGITUDINAL | 267 × 388 (mm) |
| SECOND CHINESE SIZE | LONGITUDINAL | 194 × 267 (mm) |
| SECOND CHINESE SIZE | TRANSVERSAL | 267 × 194 (mm) |

ELECTRICITY WASTE SUPPRESSING ORIGINAL DOCUMENT SIZE DETECTION APPARATUS

CROSS REFERRENCE TO RELATED APPLICATION

This patent document is a continuation of U.S. application Ser. No. 10/992,738, filed on Nov. 22, 2004, and claims priority under 35 USC §119 to Japanese Patent Application No. 2003-391266 filed on Nov. 20, 2003, entire contents of each of which are herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method for detecting a size of an original document to be read in an image forming apparatus, such as an image scanner, a copier, a facsimile, etc., which includes an original document reading function. The present invention also relates to an original document reading apparatus and an image forming apparatus capable of detecting a size of an original document.

2. Discussion of the Background Art

Figure 13:
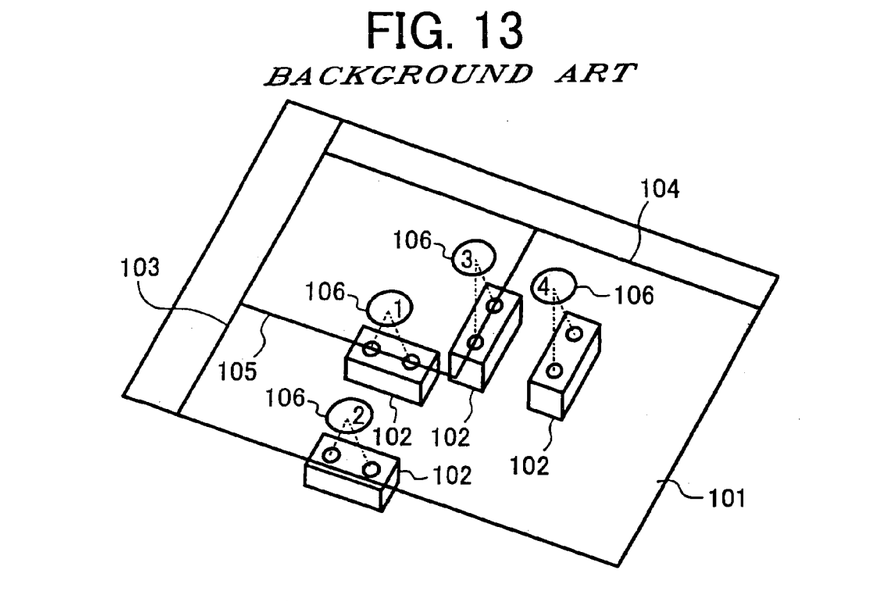
FIG. 13 illustrates a background original document size detection system using a plurality of light reflection type sensors.
Figure 14:
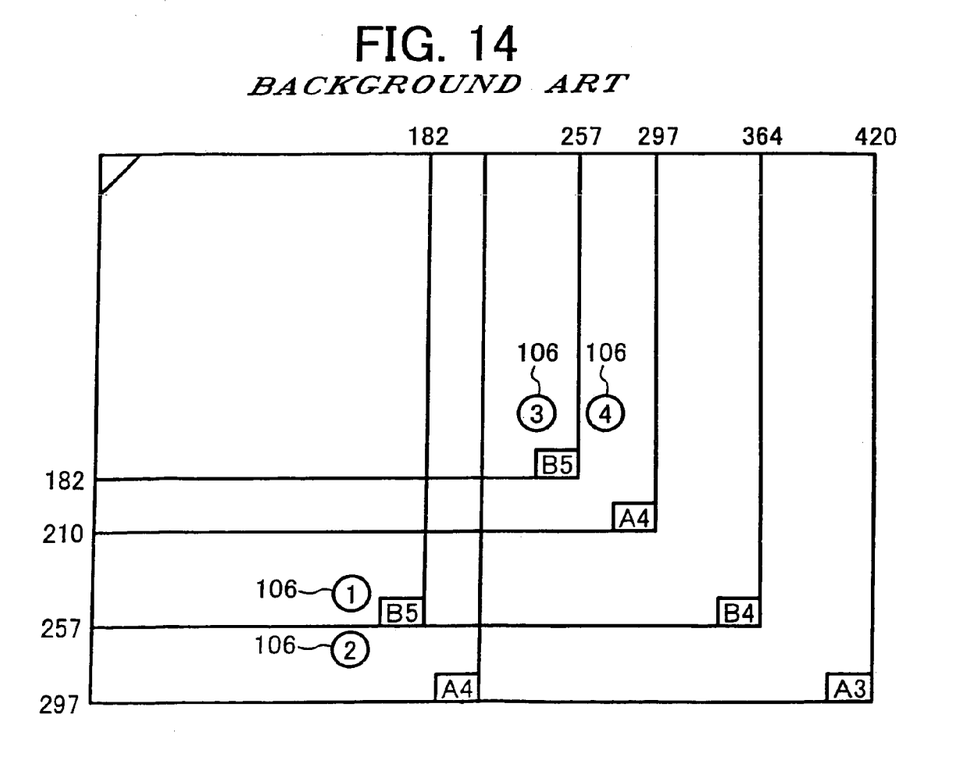
FIG. 14 illustrates an exemplary positional relationship between detection positions, in which background light reflection type sensors are arranged, and various sizes of original documents.
Figure 15:
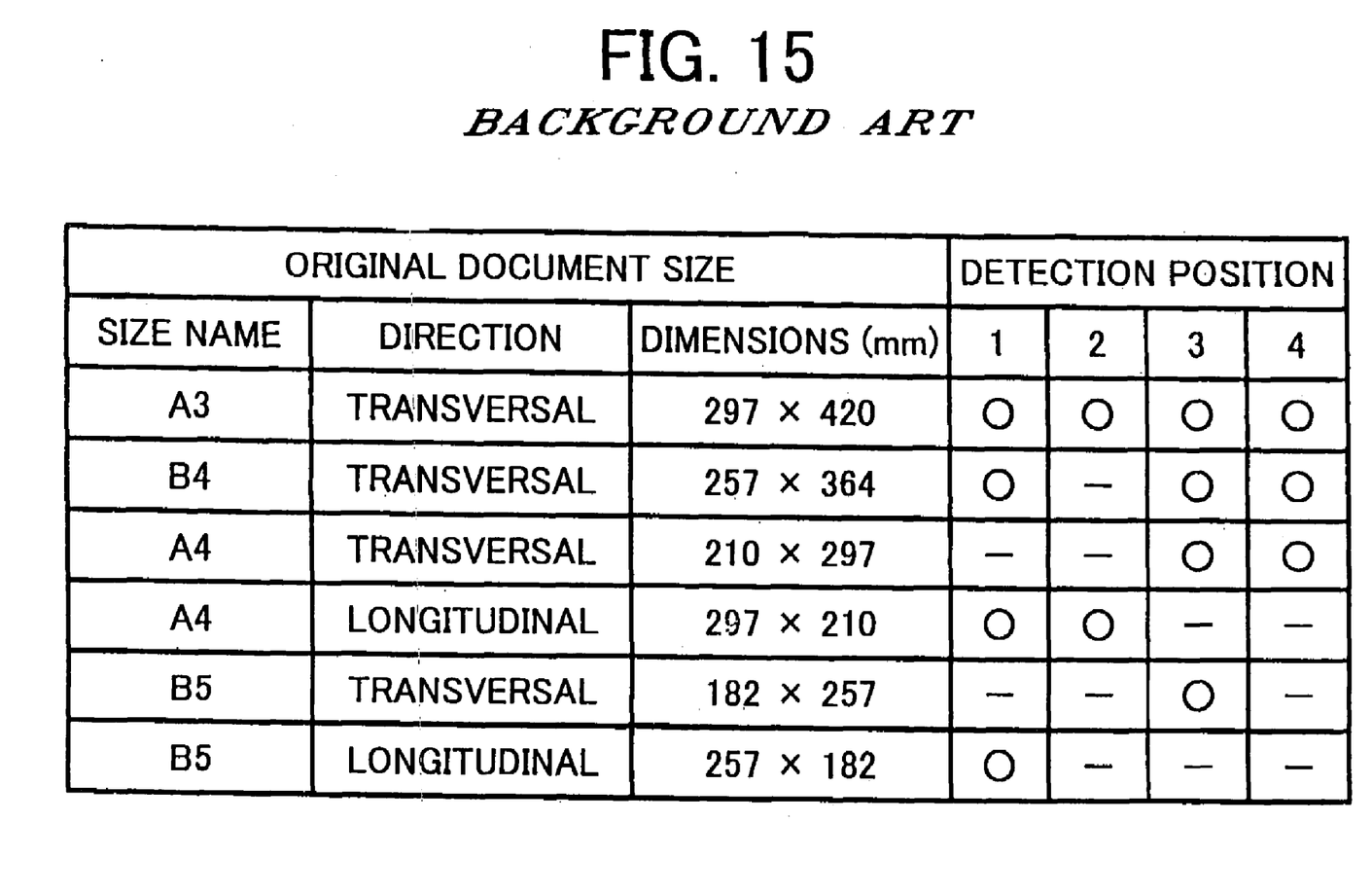
FIG. 15 illustrates an exemplary table showing a relationship between detection positions, in which a plurality of sensors of a background light reflection type are arranged, and various sizes of original documents.

It is known that a background original document reading apparatus, such as an image scanner, and an image forming apparatus, such as a copier, a facsimile, a printer, etc., having an original document reading apparatus, generally automatically detects a size of an original document placed on an original document transparent table such as a contact glass. Specifically, as illustrated in FIGS. 13 and 14, a plurality of reflection type sensors 102 are arranged at positions 106-1, 106-2, 106-3, and 106-4 to detect various sizes of original documents, such as B5, A4, B4 (JIS). Such a reflection type sensor 102 is formed from a light emitting element such as a light emitting diode (LED) and a photo acceptance unit such as a photodiode. The reflection type sensor 102 emits light from the light emitting element onto an original document 105 that is set on an original document table 101 aligned with a pair of original document reference positions 103 and 104, which are disposed at left and rear side ends thereof. The photo acceptance unit of the sensor 102 detects and recognizes a presence of light reflected from the surface of the original document. A size of the original document is detected in accordance with a combination of the presences, i.e., the detections, of the reflection light as shown in the Table in FIG. 15.

However, such a method poses challenges that a size and a setting position of an original document below a standard may not be detected, or cost may rise to precisely detect all document sizes, because the reflection sensors are required to be arranged at prescribed positions below the original document table.

As one approach, Japanese Patent Application Laid Open No. 2-207237 proposes that a width and a length of an original document are detected at high resolution by exposing an original document, imaging reflection light from the original document on a line sensor, such as a CCD, and detecting a pixel that reacts in the line sensor.

However, according to such an approach, a light source significantly generates heat and wastes electric power. That is, an illumination lamp, such as a halogen lamp, a fluorescent light, etc., is needed to be continuously turned on when the sizes are detected.

Further, Japanese Patent Application Laid Open No. 9-73141 proposes another type of an original document size detecting apparatus. Specifically, an illumination device is provided to obliquely emit a segment state illumination light to an original document. A photo acceptance unit is arranged perpendicular to an original document table with its light receiving surface arranged in parallel to the segment state illumination light. The photo acceptance unit is formed from a plurality of photo acceptance elements in an array state with their light receiving surface arranged in parallel to a light emission surface of the illumination device. The width of the light receiving surface is designed to be larger as it approaches the illumination device. According to such an original document size detecting apparatus, an original document can be constantly detected finely, even if the original document table vibrates in height, because the segment state illumination section and the surface of the photo acceptance unit are axisymmetric and magnifications at back and forth sides of the photo acceptance element are substantially the same.

However, when a width and a length of an original document are detected, at least two pairs of original document size detecting apparatuses, each of which includes a pair of illumination devices, which are formed from a light emitting element and a lens or a slit, and an array state photo acceptance element, need to be separately positioned beneath the original document table. As a result, the image forming apparatus becomes costly similar to that employing the reflection type sensor.

Further, brightness of a light emitting diode LED is recently improved, and accordingly a LED array is formed from LED elements in a line state and serves as a long size illumination for an original document reading apparatus.

However, various sizes of original documents cannot be detected at high resolution and precision with such a LED array. Further, such a document size detecting apparatus is undesirably costly and wastes electric power.

SUMMARY OF THE INVENTION

Accordingly, an object of the present invention is to address and resolve such and other problems and provide a new and novel original document size detecting apparatus.

In a non-limiting embodiment, an original document size detecting apparatus includes an original document table that holds an original document, an illumination device formed from a plurality of point light source elements aligned in a main scanning direction beneath the original document table and that illuminate the original document, and a moving device that moves the illumination device relative to the original document on the original document table. A photo acceptance unit is formed from a plurality of pixels that react to the light and receive light reflected from the original document to determine a size of the original document. In a preferred embodiment, the point light source elements are divided into a plurality of blocks in accordance with various sizes of the original documents to be set on the original document table. Further, each of the plurality of blocks is turned on and off successively in turn starting from a block corresponding to an original document minimum size to a block corresponding to an original document maximum size.

In another embodiment, each of the plurality of blocks stops turning on and off at a block in which one end of the original document is detected.

In yet another embodiment, the moving device starts moving the illumination device to detect a size of the original document in a sub scanning direction when each of the plurality of blocks stops turning on and off.

In yet another embodiment, the moving device moves the illumination device until a reaction to reflection light from the original document disappears while turning on the applicable block.

In yet another embodiment, the applicable block is temporarily turned off when the moving device starts moving the illumination device, and is turned on right before a first position distanced from an original document reference by a length corresponding to a predetermined standard size. Further, a presence of reaction to a reflection light from the original document is detected when the illumination device has passed the first position by a prescribed length.

In yet another embodiment, the illumination device continuously moves with the applicable block being turned off when the reaction is present at the first position, and is turned on right before a second position distanced from the original document reference by a length of another prescribed standard size to detect a presence of a reaction to a reflection light.

In yet another embodiment, any one of blocks on the original document reference side of the block having detected the end of the original document in the main scanning direction is used to detect the end of the original document in the sub scanning direction.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7 illustrates an exemplary intensity of a light reflected from an original document and accepted by a photo acceptance unit when the LED array is entirely turned on;

DESCRIPTION OF THE PREFERRED EMBODIMENTS

Figure 1:
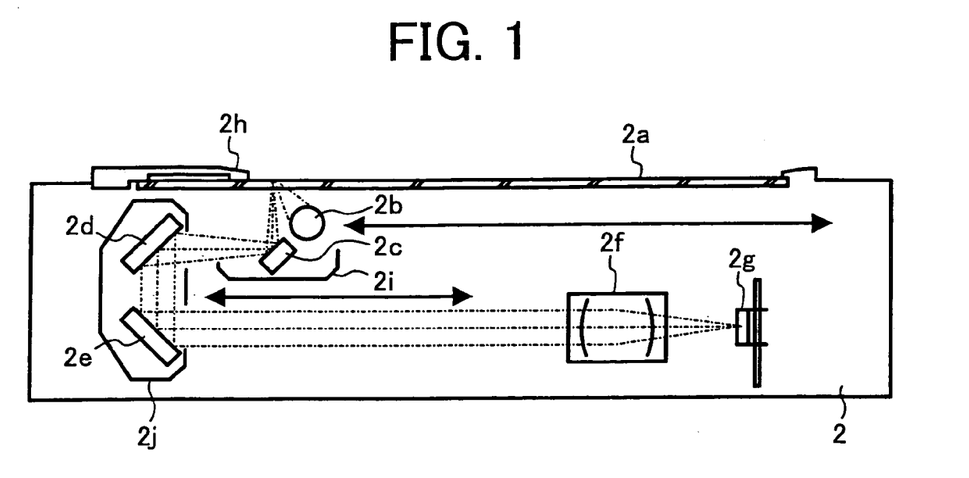
FIG. 1 schematically illustrates a cross section of an exemplary original document reading apparatus according to one embodiment of the present invention.

Referring now to the drawings, wherein like reference numerals designate identical or corresponding parts throughout the several views, and in particular to FIG. 1, an exemplary original document reading apparatus 2 according to one embodiment of the present invention is illustrated.

The original document reading apparatus 2 includes an original document transparent table (e.g. a contact glass) 2a that carries an original document thereon, an illumination lamp 2b arranged beneath the original document table 2a to illuminate the original document, a plurality of first to third mirrors 2c to 2e each of which reflects light reflected from the original document, an imaging lens 2f imaging the light reflected from the original document, and a photo acceptance unit (e.g. a CCD sensor) 2g arranged at an imaging position. The illumination lamp 2b and the first mirror 2c are supported by a first carriage 2i and are driven in directions shown by arrows in FIG. 1. The second and third mirrors 2d and 2e are supported by a second carriage 2j and are driven in directions shown by arrows in FIG. 1.

The point light source 2b has a long size, and is formed from a point light source array in a line state, which includes alignment of a plurality of point light source elements in a widthwise direction (i.e., a line direction) of the original document. The point light source array is arranged in parallel to an original document reference 2h, which is disposed at a left side end of the original document table 2a. The illumination lamp 2b illuminates the original document set on the original document table 2a, and an imaging lens 2f images reflected light onto the photo acceptance unit (a line sensor), and thereby an electric signal is read. Then, the first carriage 2i and the second carriage 2j are relatively moved to entirely read the original document.

The original document reading apparatus 2 can be employed in an image scanner used as an image input apparatus for a personal computer and the like, as well as in an original reading section of an image forming apparatus such a copier, a facsimile, a printer, etc.

Figure 2:
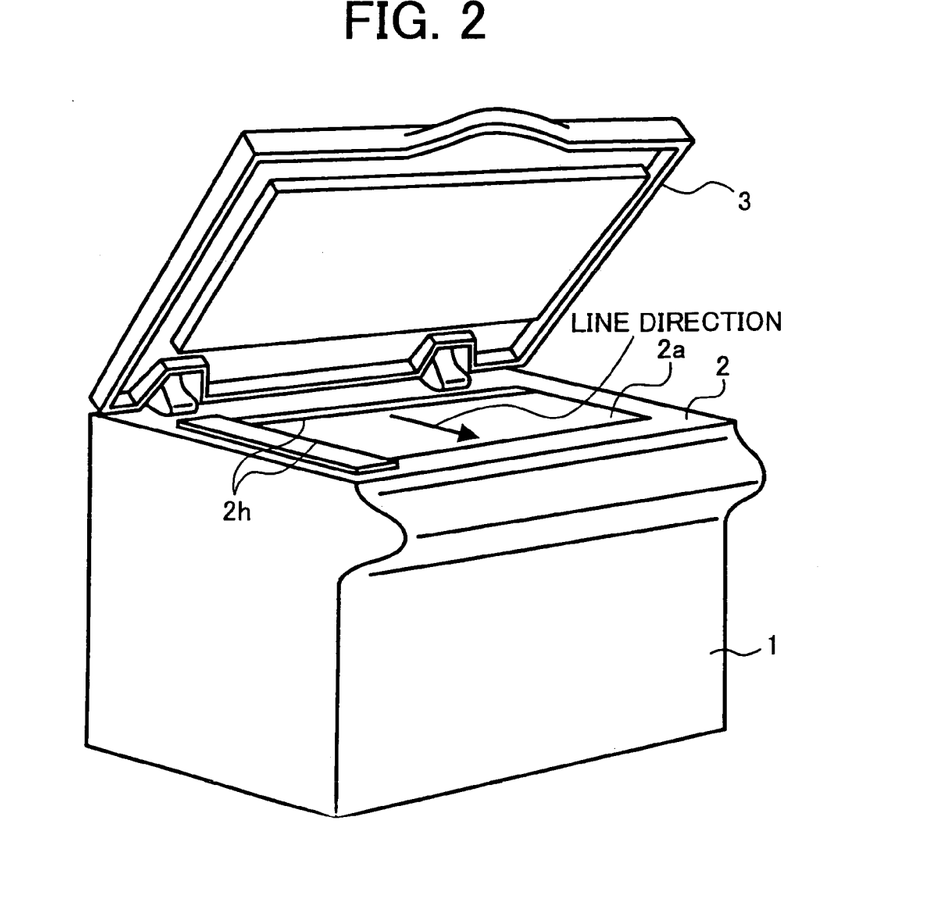
FIG. 2 illustrates an overview of an exemplary image forming apparatus employing the exemplary original document reading apparatus illustrated in FIG. 1.
Figure 3:
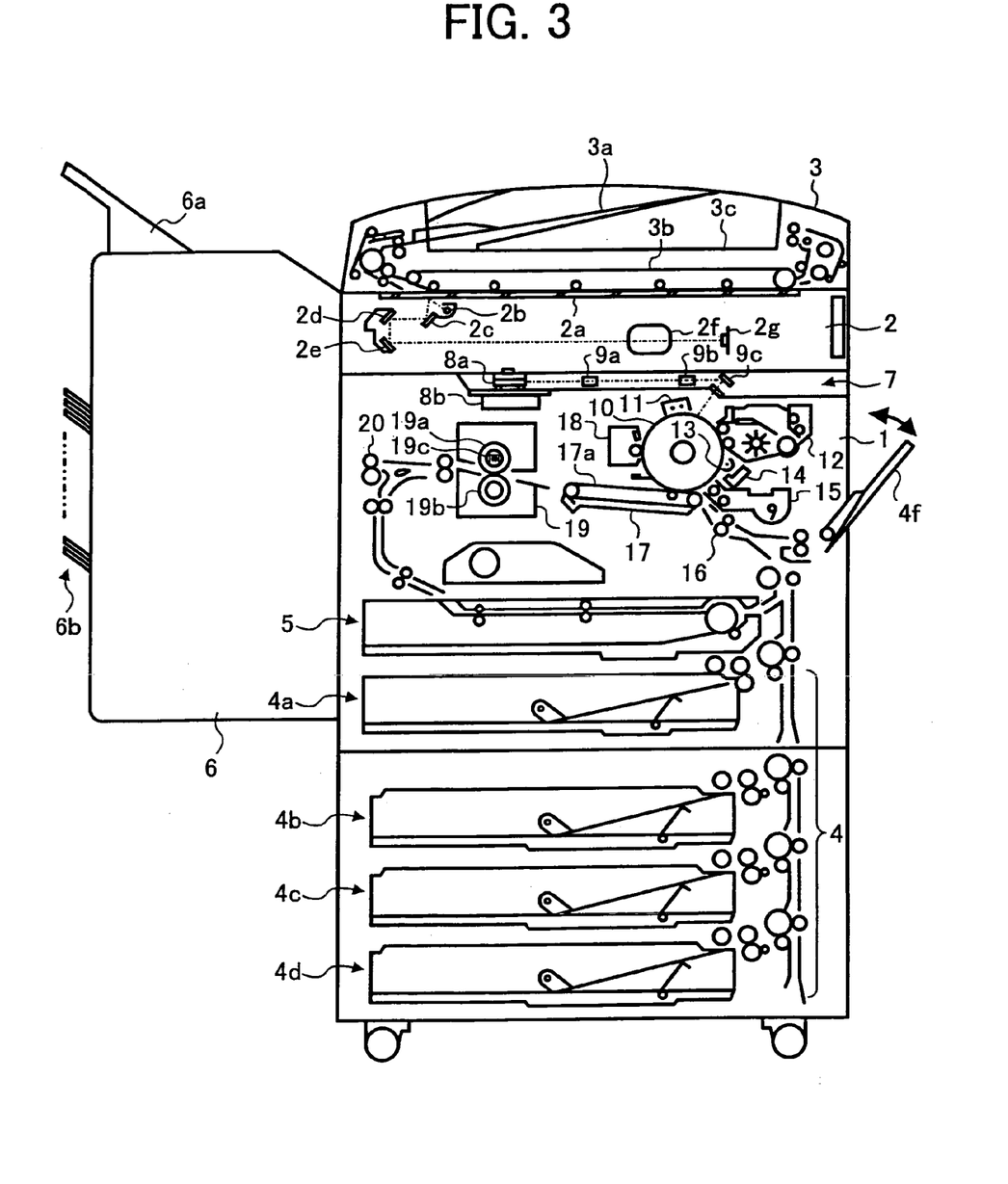
FIG. 3 schematically illustrates a construction of an exemplary image forming apparatus employing the exemplary original document reading apparatus illustrated in FIG. 1.

An outline and schematic configuration of an exemplary image forming apparatus which houses an original document reading apparatus is illustrated in FIGS. 2 and 3. As shown, reference number 1 denotes an image formation section, reference number 2 denotes an original document reading section (an original document reading apparatus), reference number 3 denotes an automatic original document feeding apparatus (ADF), and reference number 4 denotes a sheet feeding section. The original document reading section 2 includes an original document table 2a that carries an original document as mentioned above, illumination lamp 2b that illuminates an original document, the plurality of mirrors 2c, 2d, and 2e, the imaging lens 2f, and the photo acceptance unit (a line sensor such as a CCD) 2g. The line sensor 2g reads an image of an original document per a pixel, and either transmits or stores a digitized signal in a pixel memory. The ADF 3 is disposed on the original document table 2a to serve as an original document cover. Such an ADF 3 includes an original document feeding tray 3a that carries original documents to be fed, a sheet feed roller that feeds the original document, an original document conveying belt 3b conveying the original document, and an original document ejection tray 3c that receives the original document.

Reference numeral 7 denotes a writing unit that includes a light source 9a such as a laser diode, a rotational multiple surface mirror for scanning a laser light, a polygon motor 8b, an optical scanning unit 9b such as an f-theta lens, and a mirror 9c. By controlling the light source 9a to drive, and the rotational multiple surface mirror 8a to deviate and scan the laser light having image information read by the original document reading section 2, an image is written onto a photoconductive drum (PC drum) 10 serving as an image bearer provided in the image formation section 1 via the scanning optical unit 9b and the mirror 9c.

The image formation section 1 is formed from the PC drum 10, a charging apparatus 11, a developing apparatus 12, a transferring apparatus 17 having a transfer belt 17a, a cleaning apparatus 18, and a fixing apparatus 19 including a fixing roller 19a having a heater 19c and a pressure roller 19b, so as to form an image using an electro-photographic system. Specifically, a latent image is formed on the PC member 10 by the writing apparatus 7, and is developed and visualized with developer (e.g. black toner), which is stored in the developing apparatus 12.

The visualized image is then transferred onto a recordation member (e.g. a plain paper, an OHP sheet, a post card, etc.), which is selectively fed from one of the sheet feed trays 4a to 4d and a hand insertion tray provided in the sheet feeding section 4. The recordation medium is conveyed to a nip formed between the transfer belt 17a and the PC member 10 via a pair of registration rollers 16. The recordation member is conveyed by the transfer belt 17a to the fixing apparatus 19 after completion of the transfer. The image is fixed to the recordation member when heat and pressure are applied by the fixing roller 19a and pressure roller 19b, and is ejected onto either the sheet ejection tray 6a of the sheet ejection section 6 such as a sorter stapler section, a multi-step tray 6b, etc. The image formation section 1 forms a digital copier in cooperation with the original document reading section 2 and the writing section 7. The image formation section 1 and the writing section 7 can collectively serve as a printer.

As shown in FIG. 3, a duplex unit 5 is arranged between the image formation section 1 and the sheet feeding section 4 to reverse a recordation member having a print image on its one side and allow duplex image formation on both sides of the recordation member. Further, a secondary charger 13, a secondary writing section (e.g. LED array) 14, and a secondary developing apparatus 15 containing color toner, such as red, blue, etc., are provided in the image forming apparatus between the developing apparatus 12 and the transferring apparatus 17 to be secondarily used when dual color printing and similar image formation are executed.

Further, rear and left side ends of an original document table 2a serve as original document reference positions 2h. Thus, a size of the original document is automatically determined when an original document is placed and contacts the original document reference positions 2h, and then either the original document cover or the ADF is closed, or the original document is automatically fed and set thereto.

Thus, a size of the original document is determined based upon a reaction of pixels included in the photo acceptance unit 2g to light reflected from the original document and entering into the photo acceptance unit 2g.

Figure 4:
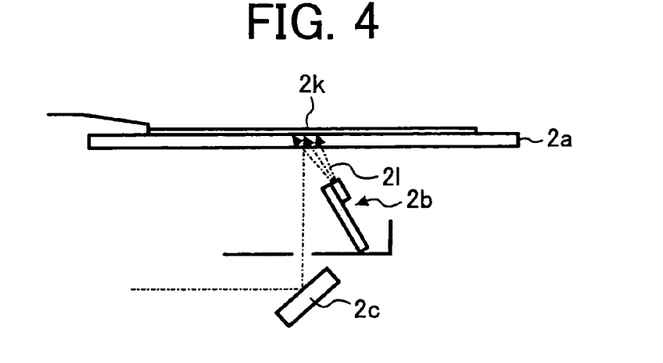
FIG. 4 schematically illustrates a construction of an exemplary original document illumination section included in an exemplary original document reading apparatus.

FIG. 4 schematically illustrates an original document illumination section of an original document reading apparatus 2.

As shown, a point light source array (e.g. a LED array) 2b, which is formed from alignment of a plurality of point light source elements such as white color LEDs in a line direction, is arranged beneath the original document table 2a to serve as an illumination lamp. It is supposed that several embodiments described hereinafter employ the above-mentioned LED array 2b.

Figure 5:
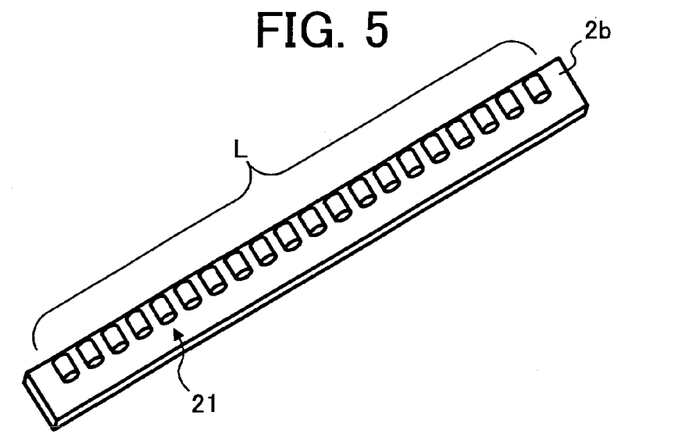
FIG. 5 schematically illustrates a perspective view of an exemplary LED array.

As shown in FIG. 5, a longitudinal length L of the LED array 2b is equivalent to or longer than a widthwise length of the original document table (i.e., a length of an original document reference positioned at the left side end).

Figure 6:
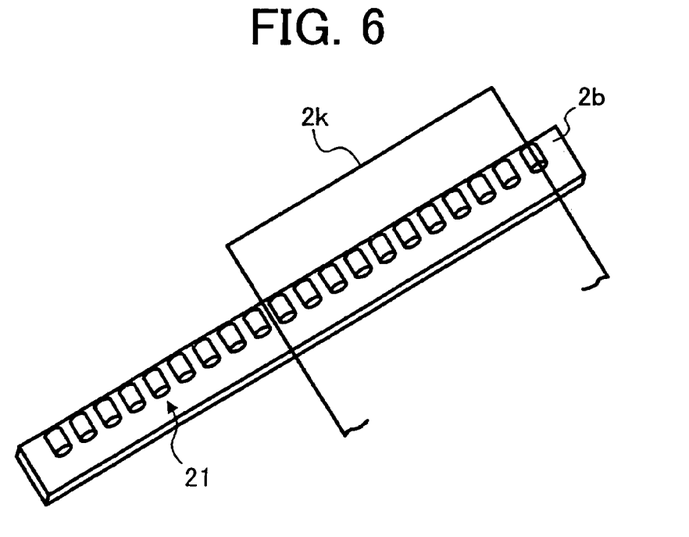
FIG. 6 illustrates an exemplary positional relationship between a LED array and an original document.
Figure 7:
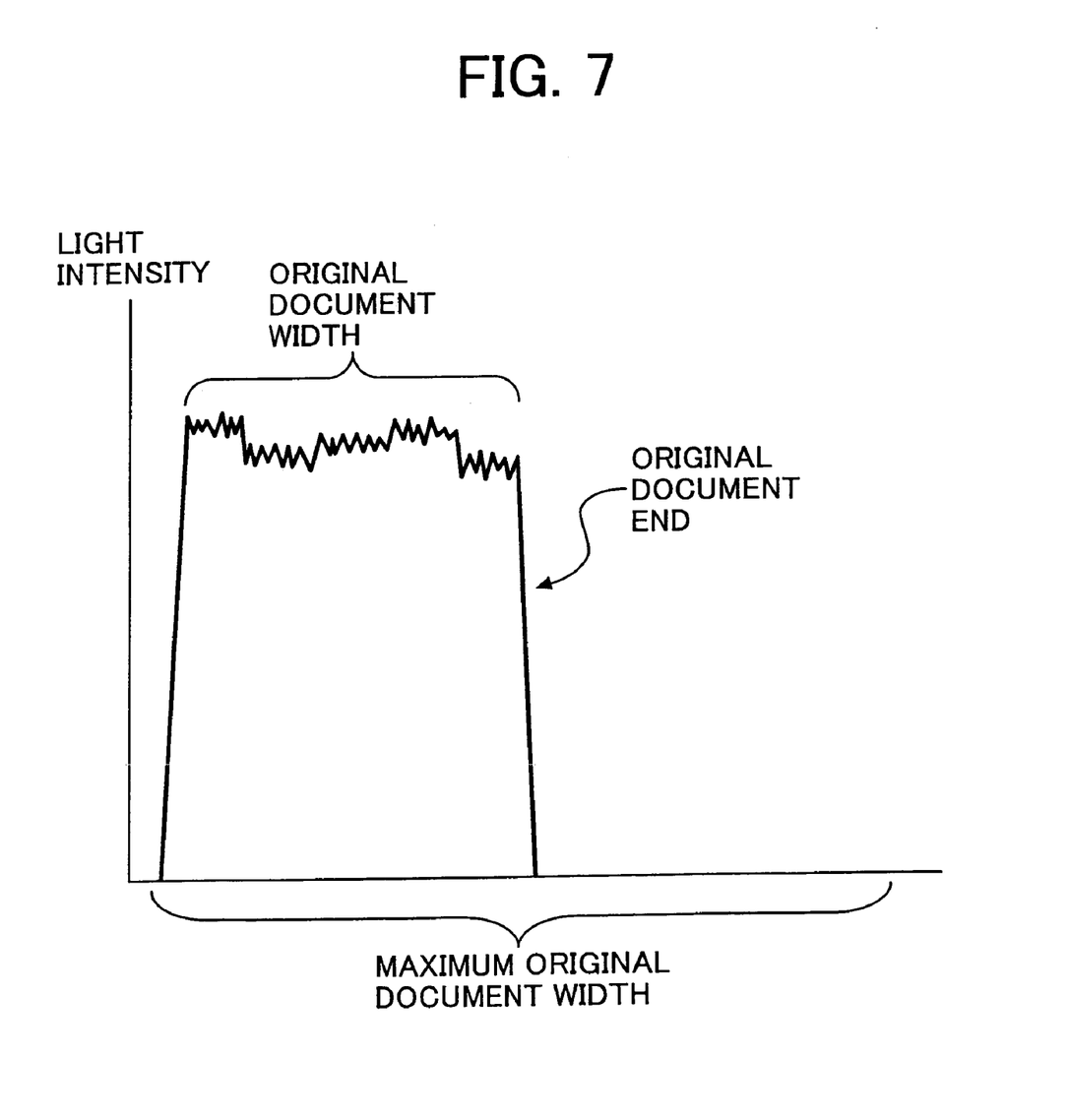

As shown in FIG. 6, when an original document 2k is placed on the original document table 2a, and the LED array 2b is entirely turned on to emit a light to the original document 2k in a positional relation, an electric signal is obtained from the photo acceptance unit 2g as shown in FIG. 7, thereby the device is capable of detecting a size of the original document 2k in the widthwise direction. When the carriage is moved while turning on the elements of the LED array 2b that covers the entire original document, an image on the original document can be read. An intensity of light output from the LED array 2b to detect the size of the original document can be weaker than that of light to read an image on the original document.

Since a detection-desired portion is only an end of the original document when a size of an original document is detected, the elements of the LED array 2b need not entirely always be turned on in the present invention. Specifically, when the original document size is to be detected and the entire elements of the LED array 2b are turned on all the time, electric power is wasted and the LED array 2b is short lived.

According to a preferred embodiment of the present invention, the LED elements 21 are divided into several blocks. Then, a carriage is initially brought to a prescribed position to read an original document 2k in an original document size detection mode. Each of the blocks is turned on and off successively in turn from a block on the side of the original document reference in the longitudinal direction of the LED array 2b, i.e., an original document minimum size side, toward a block on the side of the original document maximum size. The end of the original document is detected based upon a signal, which is generated at the time by the photo acceptance unit 2g. Specifically, the original document size detection in the longitudinal direction of the point light source array is terminated in a prescribed block, in which the end of the original document is detected. The subsequent blocks are then not turned on and off any more.

Figure 8A:
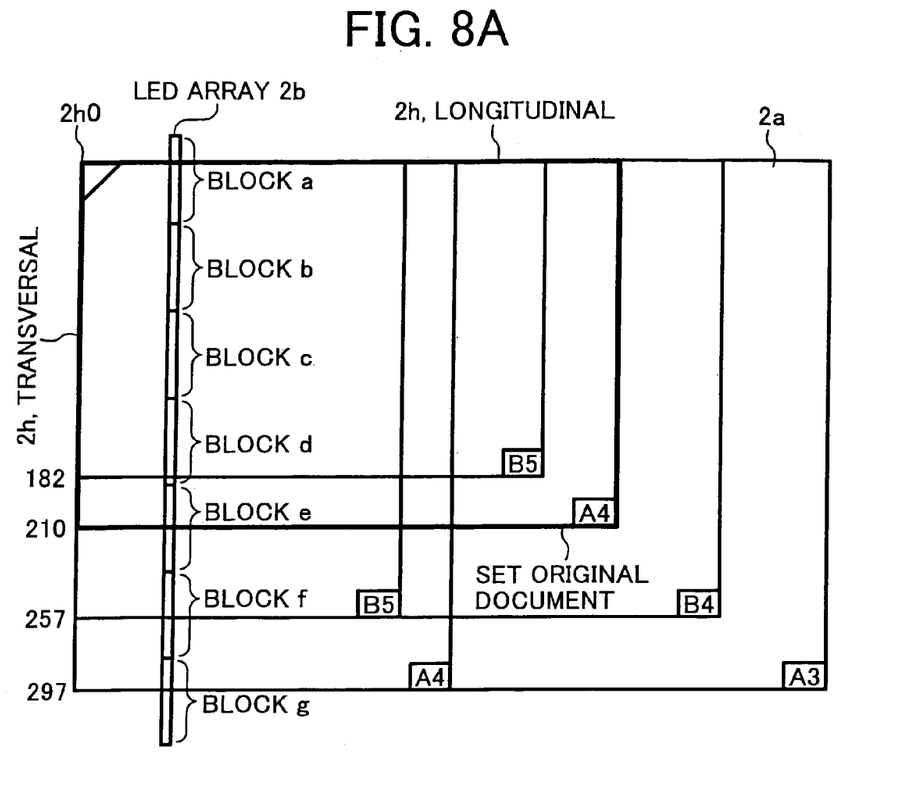
FIGS. 8A and 8B correctively illustrate an exemplary process of detecting a size of an original document using a LED array divided into a plurality of blocks.
Figure 8B:
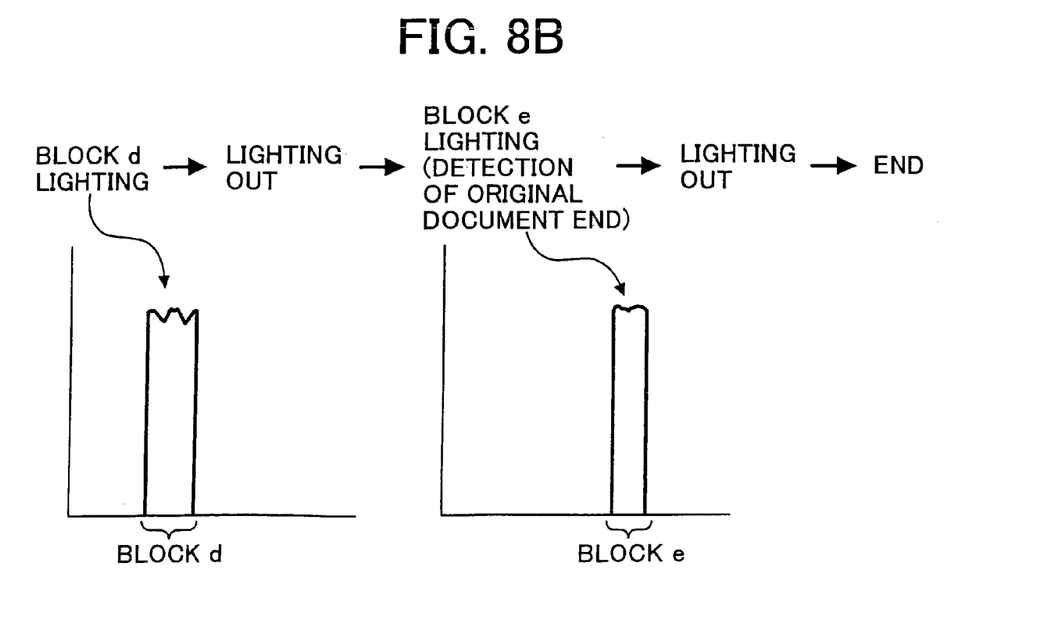

FIGS. 8A and 8B collectively illustrate an exemplary positional relationship between the blocks of an LED array 2b and various exemplary sizes of original documents set on an original document table 2a. The left side end of the original document table provides a reference with a scale indicated by a unit of millimeters in a widthwise direction of the original document 2k. A rear side corner on the original document table 2a serves as an original document reference point 2h0. By placing the original document with its corner engaged with the original document reference point 2h0, a size of the original document can be precisely detected. Further, the LED array 2b runs in a longitudinal direction of the original document 2k from left to right in the drawing.

As shown, the LED elements 21 are divided into a plurality of blocks each having a unit of a prescribed number thereof, and the respective blocks are designed to independently turn on and off. Specifically, an applicable block is turned on in turn from the block corresponding to the minimum size to that of the maximum size, while repeating a cycle of operations of checking a reflection light from the original document, turning off the applicable block, turning on the next block, until the other end of the original document is detected and found.

It is supposed hereinafter that the widthwise and longitudinal directions of the original document table correspond to lateral and longitudinal directions of the original document.

When a minimum original document B5 (JIS) is longitudinally set, a block d is initially turned on. Then, the block d is turned off and the next block e is then turned on as shown in FIG. 8B, because reactions to a reflection light from the original document entirely appear in an applicable width of the divided photo acceptance elements. When there exists reactions from some of photo acceptance elements less than the divided photo acceptance elements, the other end of the original document is detected here, and the block e is turned off. Further, since transition to the subsequent division blocks is needless, the original document detection mode is terminated, i.e., the other blocks f and g are never turned on.

With the above-mentioned performances, a size of the original document in the widthwise direction can be precisely detected, while saving electric power.

However, even if the width of the original document can be detected by the above-mentioned manner, an original document having the same width and different length from other original documents, such as a laterally set B5 (JIS) (hereinafter referred to as B5 lateral), a longitudinally set B4 (JIS) (hereinafter referred to as B4 longitudinal), etc., can not be distinguished.

Hereinafter a preferred embodiment is described while supposing that a longitudinal direction of the LED array 2b corresponds to a widthwise direction of the original document, and a moving direction of the carriage 2i corresponds to a lengthwise direction of the original document.

Figure 9:
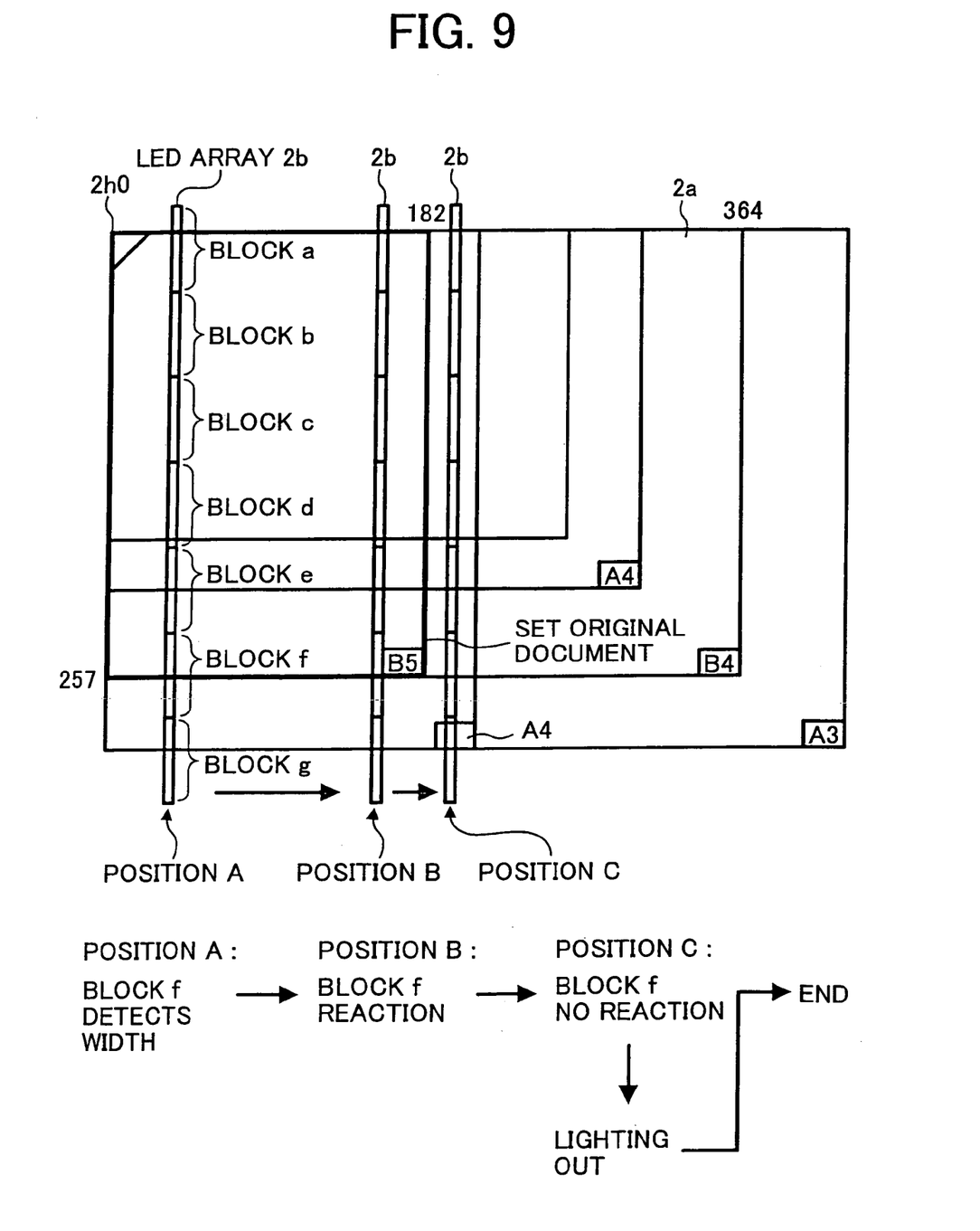
FIG. 9 illustrates another exemplary process of detecting a size of an original document using a LED array divided into a plurality of blocks.

Specifically, in an original document size detection mode, the carriage 2i is moved to a prescribed position to detect a length of an original document. Then, each of the respective blocks is turned on and off per a block in turn from a block corresponding to an original document of the minimum size set on the side of the original document reference point 2ho when viewed in the direction of the LED array 2b (e.g. a block d, when the original document minimum size is a longitudinally set B5 (JIS) ) to the side of an original document of the maximum size as shown in FIG. 9.

The original document size detection mode is terminated when the other end of the original document is detected in a prescribed block, which is distanced from the original document reference 2ho in the widthwise direction by one of 210, 215.9, 254, 257, 267, 279.4, and 297 mm when the original document is one of Japanese, American, and Chinese standards. Then, the carriage 2i is moved until a reaction to a reflection light from the original document disappears while the applicable block is continuously turned on. As a result, the length of the original document is detected.

More specifically, when an original document set on the original document table 2a is B5-lateral, the carriage initially stops at a left side end position A, and the original document size detection mode starts. Each of the respective blocks is then turned on and off in turn from a block d to the block g. The other end of the original document can be detected based on a signal generated by the photo acceptance unit.

If the other end of the original document is detected in the block f distanced from the original document reference 2h0 in the widthwise direction by 257 mm, the original document size detection mode is terminated at the block f. Subsequently, the carriage is moved while the block f is continuously turned on. When a reaction to a reflection light from the original document appears at the position B distanced from the original document reference 2h0 by a length less than 182 mm, i.e., a length of a traversally set B5, and disappears at the position C next to the position B, the original document size is determined as the traversally set B5. If the reaction also appears at the position C, the original document size is determined as a longitudinally set B4. Thus, the original document size can be precisely detected.

In the above-mentioned embodiments, the width and length of the original document can be precisely detected. However, since LED elements of an applicable block are continuously turned on even during transition to the subsequent blocks, electric power is wasted. Then, when an original document having the same width and a different length is detected, the LED elements are turned off and turned on only back and forth of a boundary to detect a length of the original document. As a result, energy can be further saved and the LED elements can have even longer lifetimes.

Hereinafter, plural embodiments, which achieve the above-mentioned goal, are described using various standard size original documents.

First, when an original document placed on the original document table 2a has the same width and a different length from other original documents, such as a traversally set A5 and a longitudinally set A4, etc., the end of the original document is detected at a block e distanced from the original document reference by 210 mm in the widthwise direction. Then, the carriage starts moving while the applicable block is temporarily turning off. The applicable block is turned on right before the position distance from the original document reference 2ho by 148 mm in the carriage moving direction. It is then detected if a reaction to a reflection light from the original document is present when the carriage has passed the position of 148 mm by a prescribed amount. The applicable block is turned off, and the original document size detection mode is terminated, if the reaction is wholly or partially absent.

Accordingly, even when an original document having the same width and different length is detected, electric power can be saved in comparison with a case when the carriage is moved continuously turning on the block, because the applicable block is turned on only before and after the border. Further, the point light source array illumination can have a longer lifetime.

Figure 10:
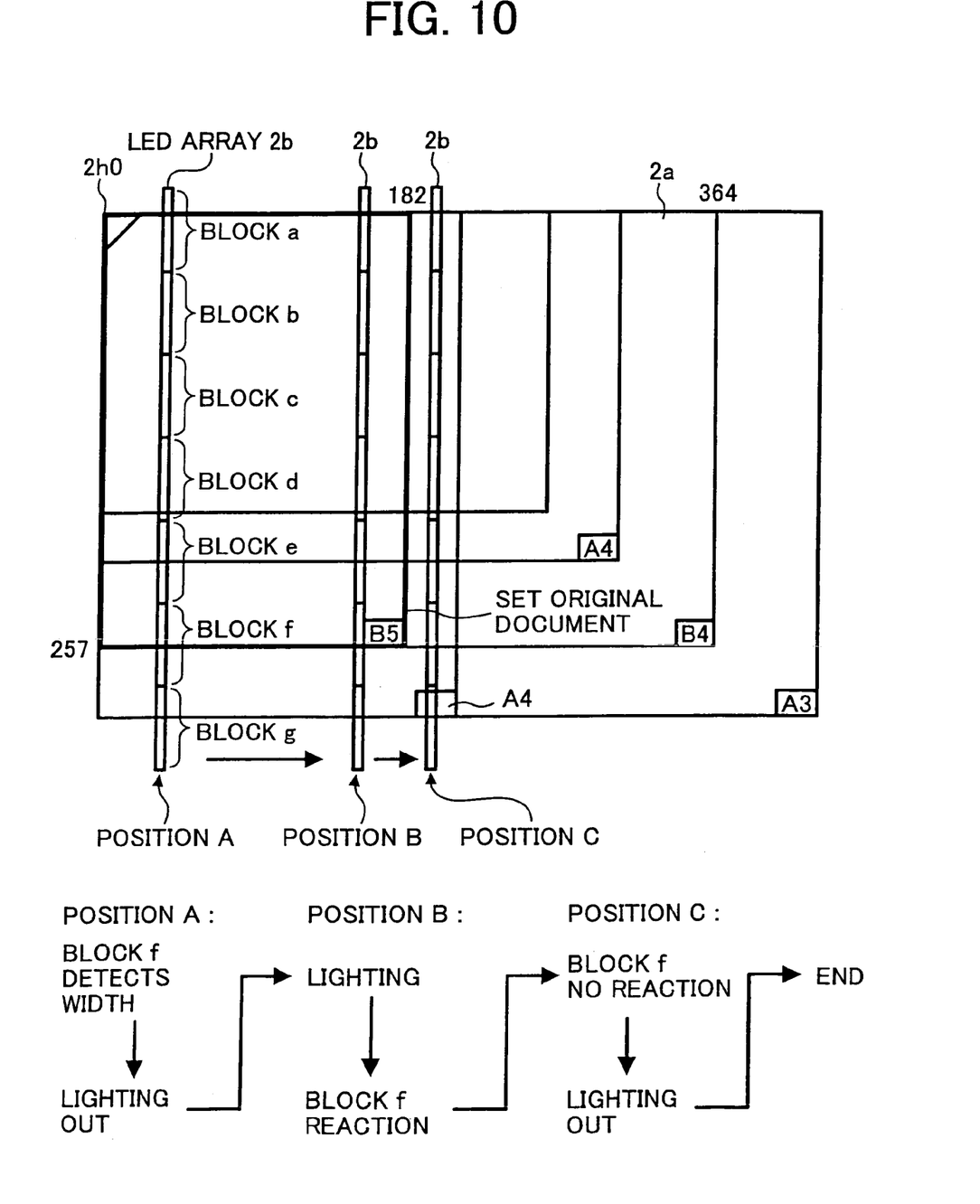
FIG. 10 illustrates still another exemplary process of detecting a size of an original document using a LED array divided into a plurality of blocks.
Figure 11:
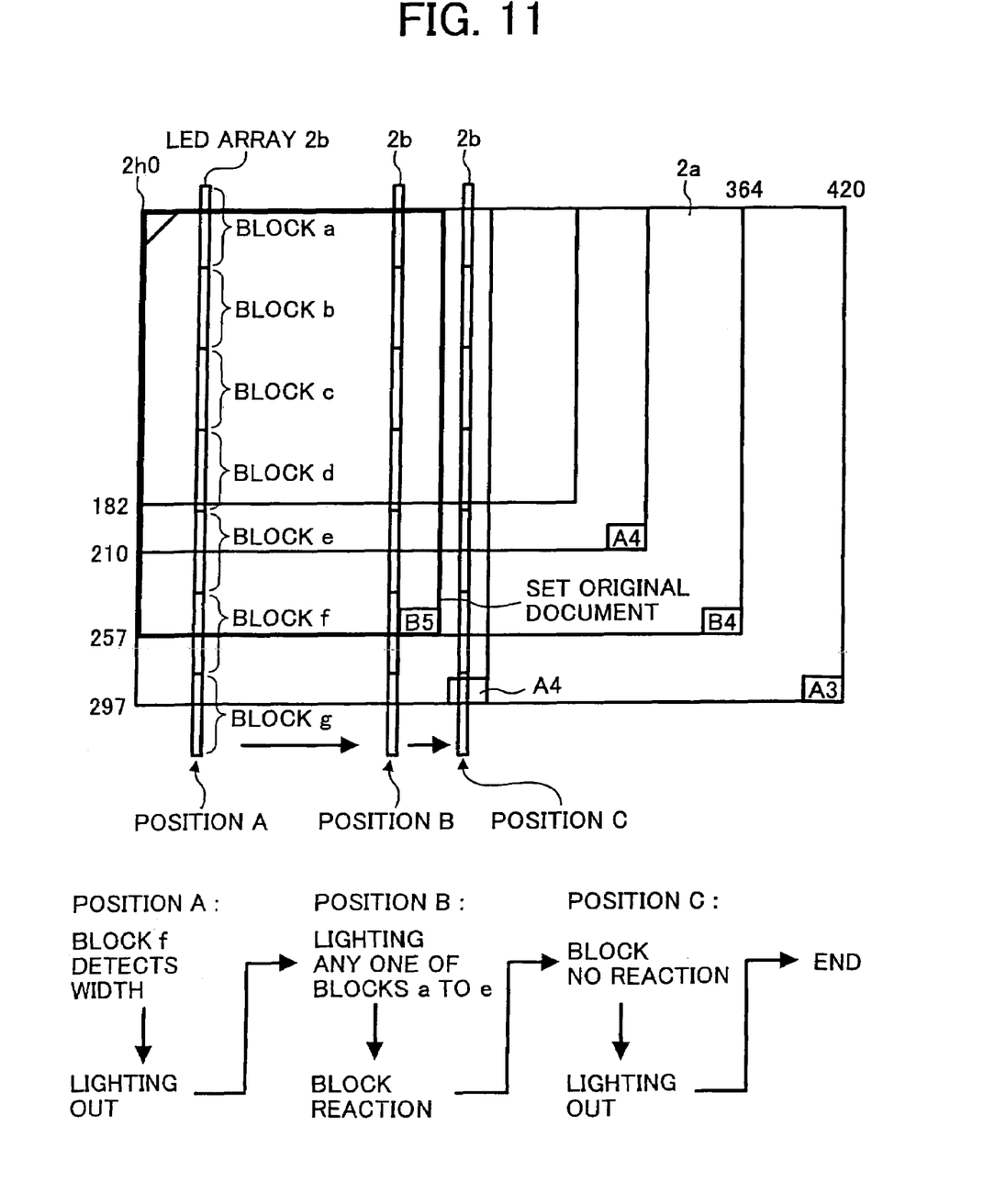
FIG. 11 illustrates still another exemplary process of detecting a size of an original document using a LED array divided into a plurality of blocks.
Figure 12:
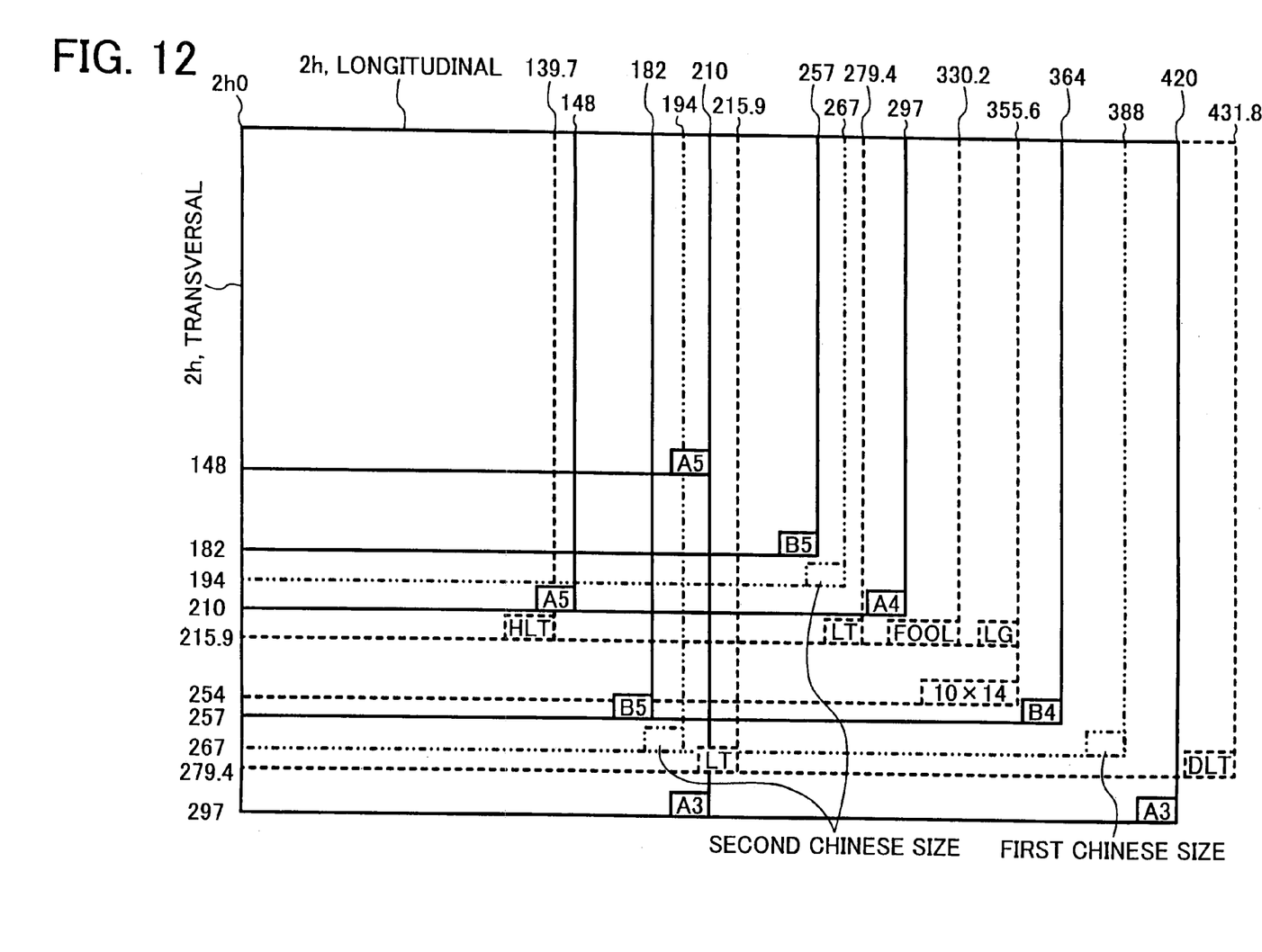
FIG. 12 illustrates various exemplary sizes of original documents to be set on an original document table and detected by an exemplary original document size detecting method according to one embodiment of the present invention.

Further, when an original document placed on the original document table 2a has the same width and a different length from other original documents, such as HLT and LT, Foolscap and LG, a traversal B5 and a longitudinal B4, a first and second Chinese standards, a LT and a DLT, a traversally set A4 and a longitudinally set A3, etc., detection of a size of an original document is performed at appropriate widthwise and lengthwise positions as illustrated in FIGS. 10 and 12 in a similar manner to that described above.

In the above-mentioned several embodiments, a block having detected a width of an original document is continuously used to detect the length thereof. However, if the same block is repeatedly used, the applicable block may have an operable life that is shortened. In particular, blocks corresponding to highly frequently used sizes, such as B5, A4, etc., can be short-lived. Then, in order to avoid such a problem, one of the blocks on the original document reference side of the block having detected the end of the original document in the direction of the LED array 2b is preferably used to detect the end of the original document in the carriage moving direction.

Specifically, as shown in FIG. 12, when the original document of B5 is longitudinally placed, for example, the end of the original document is detected at a block f of the LED array, the block f is then turned off and an optional one of blocks within the width of the original document other than the block f is used to detect the length of the original document. That is, if the same block f is used to detect the length of the original document, LED elements in the block f are undesirably short-lived. To avoid that problem, one of blocks a to e is turned on, and a reaction to a reflection light from the original document is detected in the carriage moving direction as mentioned earlier. Thus, since a block to be used in detecting the end of an original document in a carriage moving direction is selected from among those blocks on the original document reference side of the applicable block, which has detected the end of the original document in the array direction, the block having detected the end of the original document in the array direction can be prevented from being reused. As a result, concentration of life deterioration on a specified block can be suppressed or even avoided.

Figure 16:
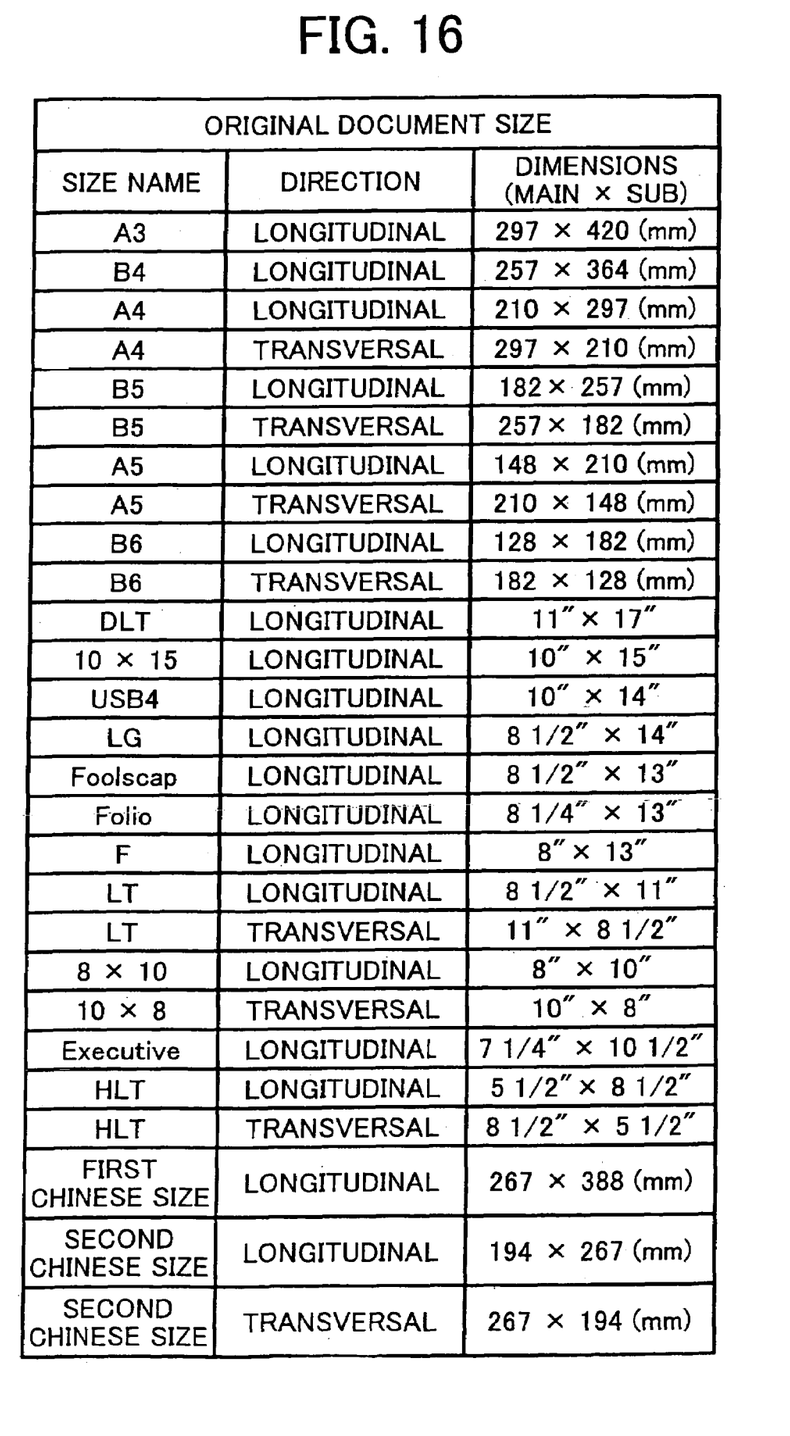
FIG. 16 illustrates an exemplary table showing various sizes of original documents to be detected by an exemplary original document size detection method according to one embodiment of the present invention.

FIG. 16 illustrates a Table that lists various sizes of original documents placed on an original document table to be detected by an original document size detection method according to the present invention. Specifically, the Table in FIG. 16 lists names, placement directions, and dimensions of original documents. An original document reference 2h (traversal) represents a scale for a widthwise direction, i.e., an array direction of the LED and a main scanning direction. An original document reference 2h (longitudinal) represents a scale for a lengthwise direction, i.e., a moving direction of the carriage and a sub scanning direction. Further, it is regarded as a longitudinal direction when a lengthwise direction of the original document corresponds to that of the original document table. It is also regarded as a lateral direction when a lengthwise direction of the original document corresponds to a widthwise direction of the original document table. Main and sub dimensions represent a width and a length of the original document.

Numerous additional modifications and variations of the present invention are possible in light of the above teachings. It is therefore to be understood that within the scope of the appended claims, the present invention may be practiced otherwise that as specifically described herein.

The invention claimed is:

1. An original document width detecting apparatus, comprising:
    an original document table configured to hold an original document;
    an illumination device formed from a plurality of light source elements and configured to illuminate the original document, said plurality of light source elements being aligned in a widthwise direction of the original document beneath the original document table; and
    a photo acceptance unit configured to receive light reflected from the original document, said photo acceptance unit including a plurality of pixels configured to react to the received light;
    wherein said light source elements are divided into a plurality of blocks, and
    wherein a control unit controls each of said plurality of blocks to be turned on and off in successive turns starting from a first block to other of the light source elements.

2. The original document size detecting apparatus according to claim 1, wherein the control unit controls each of said plurality of blocks to stop turning on and off at a block in which one end of the original document is detected.

3. The original document size detecting apparatus as claimed in claim 2, wherein the control unit controls any one of blocks on the original document reference side of the block having detected the end of the original document in the main scanning direction to be used to detect the end of the original document in the sub scanning direction.

4. The original document size detecting apparatus as claimed in claim 2, wherein an intensity of said light to detect the size of the original document is weaker than that of the light to read an image on the original document.

5. An original document size detecting apparatus, comprising:
    means for holding an original document;
    means for illuminating, formed from a plurality of light source elements, the original document, said plurality of light source elements being aligned in a widthwise direction of the original document beneath the original document table;
    means for receiving light reflected from the original document, including means for reacting to the received light;
    wherein said light source elements are divided into a plurality of blocks, and
    wherein a control unit controls each of said plurality of blocks to be turned on and off in successive turns starting from a first block to other blocks of the light source elements.

6. The original document size detecting apparatus according to claim 5, wherein the control unit controls each of said plurality of blocks to stop turning on and off at a block in which one end of the original document is detected.

7. The original document size detecting apparatus as claimed in claim 6, wherein the control unit controls any one of blocks on the original document reference side of the block having detected the end of the original document in the main scanning direction to be used to detect the end of the original document in the sub scanning direction.

8. The original document size detecting apparatus as claimed in claim 6, wherein an intensity of said light to detect the size of the original document is weaker than that of the light to read an image on the original document.

9. An original document size detecting method for use in a device including an original document table configured to hold an original document, an illumination device formed from a plurality of light source elements and configured to illuminate the original document, said plurality of light source elements being aligned in a widthwise direction of the original document beneath the original document table, and a photo acceptance unit configured to receive light reflected from the original document, said photo acceptance unit including a plurality of pixels configured to react to the received light, wherein said light source elements are divided into a plurality of blocks, the method comprising:
  turning on and turning off each of said plurality of blocks in successive turns starting from a first block to other blocks of the light source elements.

10. The original document size detecting method according to claim 9, wherein each of said plurality of blocks stops turning on and off at a block in which one end of the original document is detected.

11. The original document size detecting apparatus as claimed in claim 10, wherein any one of blocks on the original document reference side of the block having detected the end of the original document in the main scanning direction is used to detect the end of the original document in the sub scanning direction.

12. The original document size detecting apparatus as claimed in claim 10, wherein an intensity of said light to detect the size of the original document is weaker than that of the light to read an image on the original document.

* * * * *